United States Patent [19]

Claassen

[11] Patent Number: 4,989,792
[45] Date of Patent: Feb. 5, 1991

[54] VALVE ARRANGEMENT FOR INTERMITTENT APPLICATION OF A FLUID ADHESIVE TO A SUBSTRATE

[75] Inventor: Henning J. Claassen, Lüneburg, Fed. Rep. of Germany

[73] Assignee: Nordson Corporation, Westlake, Ohio

[21] Appl. No.: 302,528

[22] Filed: Jan. 27, 1989

[30] Foreign Application Priority Data

Feb. 26, 1988 [EP] European Pat. Off. ...... 88 102 920.1

[51] Int. Cl.⁵ .................................................. B05B 1/30
[52] U.S. Cl. ..................................... 239/586; 251/31
[58] Field of Search ............... 251/63, 5, 31; 137/906; 239/583, 586, 569

[56] References Cited

U.S. PATENT DOCUMENTS

| | | | |
|---|---|---|---|
| 2,879,947 | 3/1959 | Siefen | 239/411 |
| 3,315,899 | 4/1967 | Quarve | 239/583 X |
| 3,347,135 | 10/1967 | Ahlbeck | 251/31 X |
| 3,420,208 | 1/1969 | Guthrie | 118/2 |
| 3,437,110 | 4/1969 | Birdwell | 137/906 X |
| 3,648,968 | 3/1972 | Reid et al. | 251/63.5 X |
| 3,689,025 | 9/1972 | Kiser | 137/906 X |
| 4,162,763 | 7/1979 | Higgins | 239/583 |
| 4,285,495 | 8/1981 | King | 251/63.5 |
| 4,320,858 | 3/1982 | Mercer et al. | 222/504 X |
| 4,335,744 | 6/1982 | Bey | 251/635 X |
| 4,535,966 | 8/1985 | Post et al. | 251/31 |
| 4,589,627 | 5/1986 | Grotloh | 251/31 X |

FOREIGN PATENT DOCUMENTS

| | | |
|---|---|---|
| 111852 | 6/1984 | European Pat. Off. . |
| 1652298 | 11/1971 | Fed. Rep. of Germany . |
| 3200470 | 8/1983 | Fed. Rep. of Germany . |
| 3416105 | 4/1984 | Fed. Rep. of Germany . |

Primary Examiner—Andres Kashnikow
Assistant Examiner—Kevin P. Weldon
Attorney, Agent, or Firm—Armstrong, Nikaido, Marmelstein, Kubovcik, & Murray

[57] ABSTRACT

A valve arrangement for intermittent application of a liquid adhesive, in particular a thermoplastic high-polymer material, to a substrate comprises a valve body with a bore therein terminating in an outlet nozzle, a conduit for supplying the adhesive to the bore, a valve needle reciprocable in the bore for opening and closing the outlet nozzle and a step or differential piston connected to the valve needle. The lower surface of the differential piston faces the outlet nozzle and is smaller; it is subjected to a permanently applied gas pressure which brings the valve needle into the opened position. A controllable, usually constant gas pressure applicable via a solenoid valve acts on the upper larger surface of the differential piston; and upon subjection of the differential piston to the gas pressure, the gas pressure overcomes the force generated by the continuously applied, permanent gas pressure and brings the valve needle into the closed position.

6 Claims, 2 Drawing Sheets

VALVE ARRANGEMENT FOR INTERMITTENT APPLICATION OF A FLUID ADHESIVE TO A SUBSTRATE

BACKGROUND OF THE INVENTION

1. Field of the Invention

The invention relates to a valve arrangement for intermittent application of a liquid adhesive, in particular a high-polymer thermoplastic material, to a substrate.

2. Description of the Prior Art

Valve arrangements generally have a valve body comprising a bore therein terminating in an outlet nozzle. High-polymer materials are supplied via a conduit to the bore. For opening and closing the outlet nozzle a valve needle reciprocates in the bore and must be actuated very exactly, i.e. at exactly defined instants, to ensure the accuracy of the material application necessary when operating at high operating speeds.

For displacing the valve needles, various drive means have been proposed; thus, it is known from German Auslegeschrift No. 1,652,298 to attract the valve needle by means of an electromagnet and thereby to open the outlet nozzle, while the movement of the valve needle into the closed position is effected under the action of a spring. However, the desired exact opening and closing times cannot be implemented by these means.

A variant of this basic principle is apparent from U.S. Pat. No. 4,320,858. In this case the opening of the outlet nozzle is effected with pressurized air and the closure takes place under the action of a spring. However, due to its mass inertia a spring does not respond rapidly enough. Moreover, in the course of time its spring characteristics change due to "fatigue phenomena" and consequently unacceptable fluctuations in the operating rhythm occur.

A similar embodiment for a double valve is disclosed in published European patent application No. 0,111,850.

German patent specification No. 3,200,470 discloses a valve needle comprising a step or differential piston. The valve needle is brought into the opened position by application of compressed air and brought into the closed position by a spring. In this case as well the desired, exactly defined timing of the operating rhythm cannot be achieved.

Finally, a valve arrangement of this type is disclosed in U.S. Pat. No. 3,420,208. In this case the valve needle is provided with a disk-shaped slider piston which is subjected alternately on either side to compressed air. The valve needle is being brought thereby into the opened or closed position. Due to the alternating subjection of the two sides of the piston of the valve needle to compressed air at substantially identical pressures the desired, extremely short valve clearance, which in the extreme case lasts only up to 10 ms, cannot be achieved in this case ether because the movement of the valve needle in one direction does not start until the corresponding pressure on said side of the slider piston has been substantially removed. This results, however, in pronounced fluctuations in the operating rhythm which manifest themselves especially in a particularly unfavourable manner when several such valve arrangements are arranged juxtaposed to each other and must open and close synchronously by joint actuation as is, for example, necessary for the synchronous application of a plurality of punctiform coatings onto a substrate. In these cases fluctuations arise in the operating rhythms of the individual valve arrangements which lead to displacements in the application instant and thus to coating errors with the high transport speeds of the substrate usual today.

SUMMARY OF THE INVENTION

The object of the invention is therefore to provide a valve arrangement for intermittent application of fluid adhesive, in particular a thermoplastic high-polymer material, to a substrate in which the aforementioned disadvantages are eliminated. In particular, a valve arrangement is to be proposed which has a very simple construction and can be controlled with high accuracy in such a manner that exact valve clearances of less than 5 ms become possible.

The invention therefore proposes in a valve arrangement for application of a fluid adhesive, in particular thermoplastic high-polymer materials, to a substrate comprising a valve body with a bore therein terminating in an outlet nozzle. A conduit supplies adhesive to the bore. A valve needle reciprocate in the bore for opening or closing the outlet nozzle. A control piston connected to the valve needle. Supply lines for pressurize gas opening into the bore above and below the control piston. A control means subjects the two supply lines to pressurized gas to two supply lines. The control piston is constructed as a differential or step piston, the smaller surface of which faces the outlet nozzle. The supply conduit opening between the differential piston and the outlet nozzle into the bore s continuously subjected to the pressurized gas and biases the valve needle for movement into the opened position. The valve needle is brought into the closed position when the other supply conduit is subjected to the pressurized gas.

Advantageous embodiments are defined by the features of the subsidiary claims.

The advantages achieved with the invention are based on the use of a differential or step piston which s connected to the valve needle and which on its side facing the outlet nozzle s subjected to a constant, relatively low, permanently applied gas pressure and thereby s biased for movement into the open position of the valve needle. Since this permanent compressed air acts on the smaller surface of the differential piston, the force generated thereby s relatively small.

Under the control of a solenoid valve the opposite, larger face of the differential piston is subjected to a gas pressure which is very much higher than the permanent gas pressure so that the valve needle is brought abruptly into the closed position when the gas pressure is applied.

The substantially greater pressure acting from above leads to satisfactory closure of the valve arrangement as is essential for the abrupt interruption of application with the high operating speeds common today.

Thus, if the controlled gas pressure is not applied, only the permanent gas pressure acts, i.e. the valve needle is held in the opened position., if now via the solenoid valve the controlled gas pressure is applied to the large surface of the differential piston, the force generated thereby immediately overcomes the force generated by the permanent gas pressure, i.e. the valve needle is abruptly brought into the closed position and the application of the high-polymer material is interrupted.

This valve clearance can be set very exactly because it requires only the activation/deactivation of the solenoid valve; such a solenoid valve responds very exactly and extremely rapidly so that even very short opening and closing times can be achieved.

The manufacture of the valve body is very simple because the blank which is, for example, right parallelopipedic needs only to be clamped in a drilling machine and then a bore with different diameters has to be formed in its longitudinal direction; the valve needle or the differential piston, respectively, are then reciprocable in said bore. With the reverse configuration of the differential piston, i.e. small surface at the top and large surface at the bottom, this is not possible because the blank must be rechucked in this case or made from two parts which are then screwed to form the finished valve body.

To ensure the necessary sealing of the differential piston, O-rings are provided which are inserted into corresponding grooves n the two step portions of the differential piston.

In the event of a malfunction, in particular on occurrence of problems with the gas supply, it is expedient for the valve needle to be brought immediately into the closed position. To ensure this, a helical spring can be provided between the cover of the valve body and the differential piston; this spring biases the differential piston and thus the valve needle to a movement into the closed position. Of course, the spring force is so small that it does not exceed the force opening the valve arrangement as produced by the permanent gas pressure. Thus, in normal operation said spring assists the controlled gas pressure upon closure of the valve arrangement, and upon a failure of the gas pressure brings the valve needle immediately into the closed position.

Since the valve needle s opened by being subjected to a constant, permanently applied gas pressure and closed only by application of the controlled gas pressure, any changes in the spring rates of the helical spring do not affect the operation of this valve arrangement.

BRIEF DESCRIPTION OF THE DRAWINGS

The invention will be described in more detail hereinafter with the aid of examples of embodiment with reference to the accompanying diagrammatic drawings, wherein.

DESCRIPTION OF THE PREFERRED EMBODIMENTS

Figure 1:
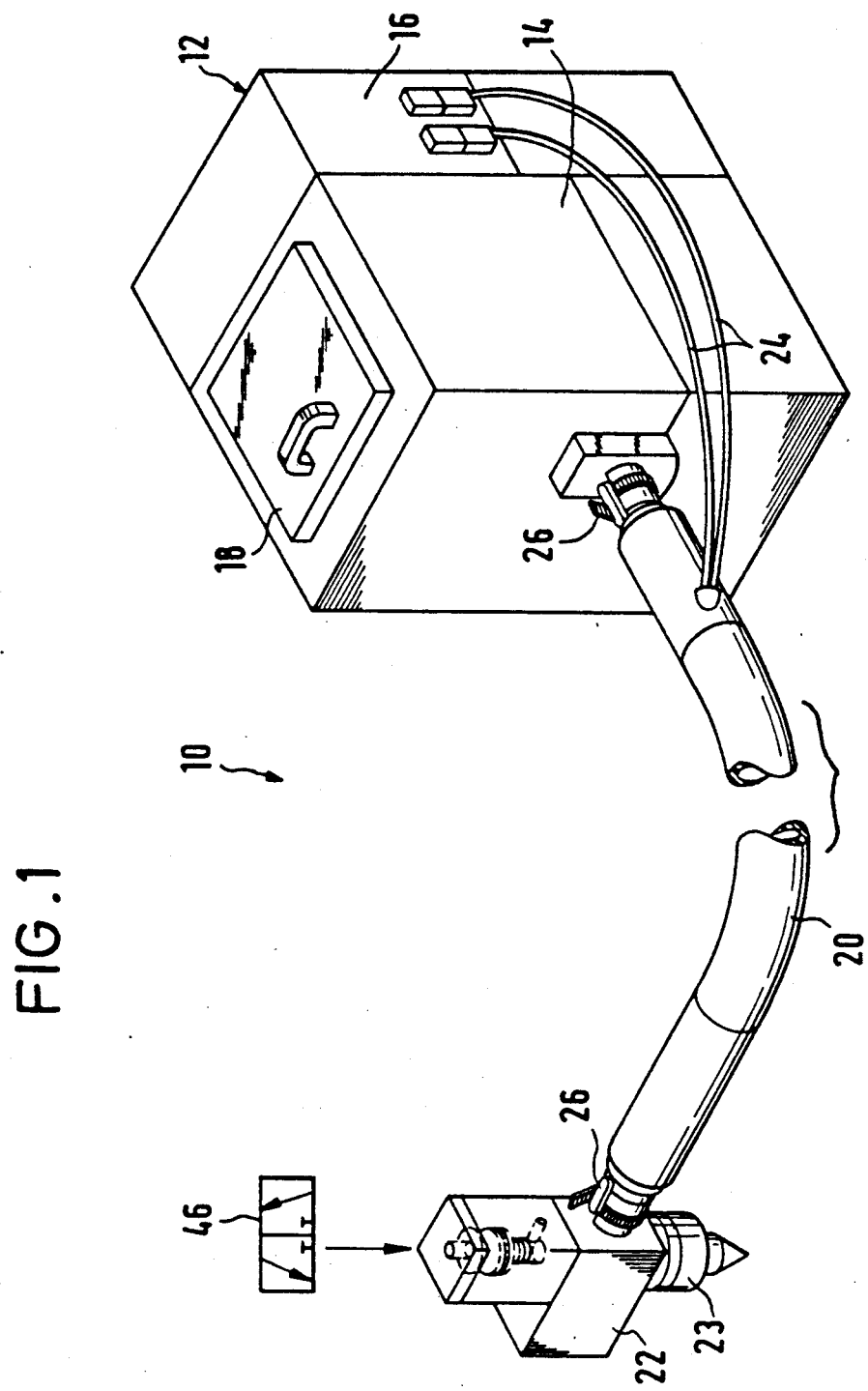
FIG. 1 is a perspective view of a system for spraying an adhesive onto a substrate.

The system shown in FIG. 1 and denoted generally by the reference numeral 10 sprays a hot-melt adhesive onto a substrate and comprises a conventional melting/metering device 12 with a liquefying section 14 and a control section 16. The liquefying section 14 is provided with a cover 18 for introducing the usually solid starting material.

The liquefying section 14 is connected via a connection hose 20 to a spray head 22 having a spray nozzle 23. Furthermore, in FIG. 1 heating and control lines 24 are shown which lead from the control section 16 to the connecting hose 20. The liquefied hot-melt adhesive and the compressed air for spraying the adhesive are supplied to the spray nozzle via the hose 20.

The basic structure of such a system for processing hot-melt adhesives is disclosed, for example, in German Offenlegungsschrift No. 3,416,105.

The two ends of the connecting hose 20 are screwed to the spray head 22 or the liquefying section 14, respectively. Said screw connection is surrounded by insulating packing sleeves 26.

Figure 2:
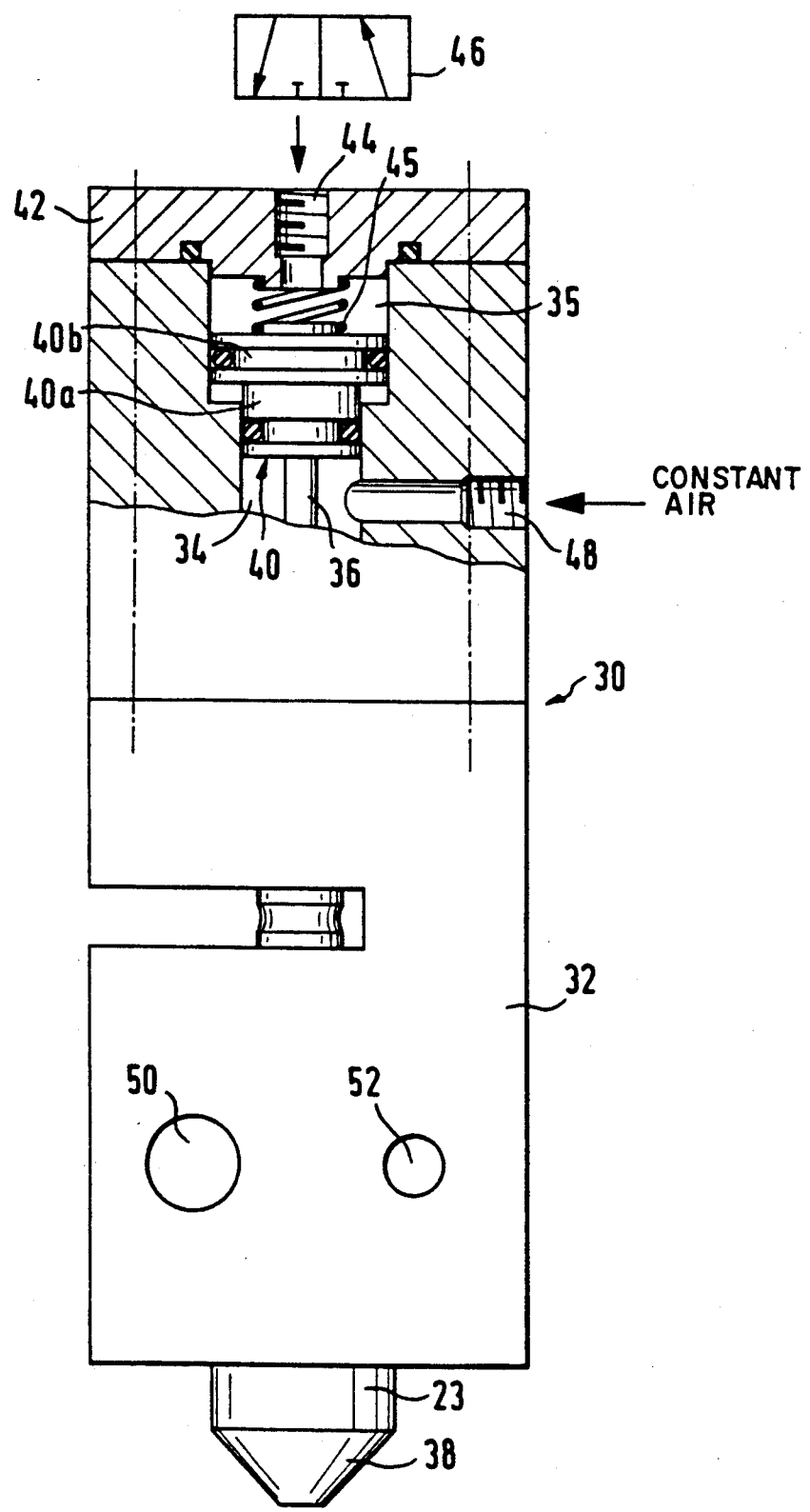
FIG. 2 is a vertical section through the valve arrangement.

The valve arrangement shown in FIG. 2 and denoted generally by the reference numeral 30 s located in the spray head 22 and comprises an elongated, right parallelopipedic valve body 32 having a cylindrical bore 34 extending in the longitudinal direction of the valve body 32. In said bore 34 a valve needle 36 can be reciprocated which opens and closes an outlet nozzle 38 of the spray nozzle 23 provided at the lower end of the valve body 32.

The upper end of the valve needle 36 facing away from the outlet nozzle 38 is connected to a differential piston 40 having two portions of different diameters, that is a lower portion 40a of small diameter corresponding exactly to the diameter of the bore 34 and an upper portion 40b of larger diameter located in a corresponding region 35 of larger diameter of the bore 34. The step between the two bore regions 34, 35 serves as a lower stopper for the differential piston 40.

Each portion 40a, 40b of the differential piston 40 comprises a groove with an O-ring which is indicated in FIG. 2 with hatched lines and bears on the inner wall of the associated bore 34 or 35.

The upwardly open end of the valve body 32 is closed by a cover 42 with a central bore 44 into which an air line (not shown) opens. The application of compressed air from the air line to the central opening 44 is controlled via a solenoid valve 46.

Between the cover 42 and the upper larger portion 40b of the differential piston 40 a helical spring 45 is disposed which biases the differential piston 40 and thus the valve needle 36 to a downward movement, thereby closing the valve arrangement.

In FIG. 2 the supply conduits 50, 52 for the liquefied material and the spray air can be seen.

Via a lateral bore 48 the bore 34 below the differential piston 40 s permanently supplied with pressurized air at a constant low pressure; this pressurized air acting on the lower small portion 40a of the differential piston 40 produces a force which displaces the differential piston 40 and thus the valve needle 35 upwardly, thereby opening the outlet nozzle 38.

The force exerted by the helical spring 45 on the differential piston 40 is smaller than the force generated by the permanently applied pressurized air, so that the valve arrangement 30 s opened when no pressurized air is applied via the central opening 44.

If now the solenoid valve 46 is opened and thus the upper larger surface of the differential piston 40 subjected to pressurized air via the central opening 44, a downwardly directed force results which, assisted by the spring 45, overcomes the force generated by the permanent compressed air at the bore 48 and displaces the differential piston 40 and thus the valve needle 36 downwardly, thereby closing the outlet nozzle.

If now the solenoid valve 46 is actuated again, this force is abruptly canceled, i.e. now the force generated by the permanent air pressure at the bore 48 substantially acts so that the differential piston 40 is displaced upwardly and thus the outlet nozzle 38 opened.

In the event of malfunctions, i.e. upon interruption of the air supply, only the helical spring 45 acts and displaces the differential piston 40 and thus the valve needle 36 downwardly so that the outlet nozzle 38 is closed as required for emergency cases.

I claim:

1. A valve arrangement for intermittent application of a liquid adhesive, to a substrate, said valve arrangement comprising:
   a valve body with a bore therein terminating in an outlet nozzle;
   a conduit for supplying adhesive to the bore;
   a valve needle reciprocable in the bore for opening or closing the outlet nozzle;
   a control piston connected to the valve needle, said control piston constructed as a differential or step piston, a smaller surface of said differential or step piston facing the outlet nozzle;
   a first supply line, opening into the bore between the smaller surface of said differential or step piston and the outlet nozzle for continuously supplying a pressurized gas to the smaller surface of the differential or step piston for biasing the valve needle for movement into an opened position;
   a second supply line opening into the bore between a larger surface of the differential or step piston and an end of the bore opposite the outlet nozzle for supplying a pressurized gas to the larger surface of the differential or step piston; and
   a control means for subjecting the second supply line intermittently to the pressurized gas, wherein when the second supply line is subjected to the pressurized gas, the biasing is overcome abruptly moving the valve needle into a closed position.

2. A valve arrangement according to claim 1, wherein the bore in the valve body has two regions with different diameters for receiving two portions of the differential piston.

3. A valve arrangement according to claim 1, wherein two portions of the differential piston are provided with O-rings which are inserted into grooves and contact the wall of the bore.

4. A valve arrangement according to claim 1, wherein subjecting the second supply line to the pressurized gas is controllable via a solenoid valve.

5. A valve arrangement according to claim 1, wherein a helical spring arranged between an upper larger surface of the differential piston and an upper end of the bore of the valve body brings the valve needle into the closed position upon occurrence of a malfunction.

6. A valve arrangement according to claim 2 further comprising a helical spring disposed between the larger surface of the differential piston and the end of the bore opposite the outlet nozzle for providing a biasing to the needle valve in the closed direction, the biasing of the spring being less than the biasing of the pressurized gas of the first supply line.

* * * * *

UNITED STATES PATENT AND TRADEMARK OFFICE
CERTIFICATE OF CORRECTION

PATENT NO. : 4,989,792

DATED : February 5, 1991

INVENTOR(S) : Henning J. Claassen

It is certified that error appears in the above-identified patent and that said Letters Patent is hereby corrected as shown below:

Column 1, line 57, change "ether" to --either--.

Column 2, line 22, change "reciprocate" to --reciprocates--.

Column 2, lines 31, 39, 41, 43, and 46, change "s" to --is--.

Column 2, line 59, change ".," to --;--.

Column 3, line 18, change "n" to --in--.

Column 3, line 34, change "s" to --is--.

Column 4, lines 6, 40 and 49, change "s" to --is--.

Signed and Sealed this

Sixth Day of October, 1992

Attest:

DOUGLAS B. COMER

*Attesting Officer*  *Acting Commissioner of Patents and Trademarks*